(12) United States Patent
Ushiyama

(10) Patent No.: US 8,881,242 B2
(45) Date of Patent: Nov. 4, 2014

(54) INFORMATION COMMUNICATION SYSTEM, INFORMATION COMMUNICATION METHOD, NODE APPARATUS AND RECORDING MEDIUM

(75) Inventor: Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 125 days.

(21) Appl. No.: 13/361,327

(22) Filed: Jan. 30, 2012

(65) Prior Publication Data

US 2012/0222095 A1 Aug. 30, 2012

(30) Foreign Application Priority Data

Feb. 25, 2011 (JP) ................. 2011-039496

(51) Int. Cl.
*H04L 29/06* (2006.01)
*H04L 29/08* (2006.01)

(52) U.S. Cl.
CPC ............. *H04L 67/1063* (2013.01); *H04L 63/10* (2013.01); *H04L 67/1091* (2013.01); *H04L 63/12* (2013.01); *H04L 67/1076* (2013.01)
USPC .............................................. 726/4; 713/176

(58) Field of Classification Search
USPC ............................................... 726/4; 713/176
See application file for complete search history.

(56) References Cited

U.S. PATENT DOCUMENTS

| | | | |
|---|---|---|---|
| 6,169,803 B1 | 1/2001 | Sako et al. | |
| 7,558,797 B2 * | 7/2009 | Li | .......................... 1/1 |
| 2005/0144080 A1 * | 6/2005 | Crocitto | .......................... 705/26 |
| 2005/0228753 A1 * | 10/2005 | Viger et al. | .......................... 705/51 |
| 2006/0272026 A1 * | 11/2006 | Niwano et al. | .................. 726/27 |
| 2007/0283043 A1 | 12/2007 | Kiyohara et al. | |
| 2008/0005086 A1 * | 1/2008 | Moore | .............. 707/3 |
| 2008/0120359 A1 | 5/2008 | Murakami | |
| 2008/0140849 A1 * | 6/2008 | Collazo | ........................ 709/229 |
| 2008/0172445 A1 * | 7/2008 | Zaidelson et al. | ............. 709/201 |
| 2008/0240490 A1 * | 10/2008 | Finkelstein et al. | .......... 382/100 |

(Continued)

FOREIGN PATENT DOCUMENTS

| | | |
|---|---|---|
| JP | A-10-268766 | 10/1998 |
| JP | A-2006-178748 | 7/2006 |

(Continued)

OTHER PUBLICATIONS

Feb. 19, 2013 Office Action issued in Japanese Patent Application No. 2011-039496 (with translation).

*Primary Examiner* — Michael Pyzocha
(74) *Attorney, Agent, or Firm* — Oliff PLC

(57) ABSTRACT

A node apparatus of an information communication system in which a content is distributed and stored by an overlay network configured by a plurality of node apparatuses and which has a center server that manages the content to be submitted to the overlay network, the node apparatus includes: a first creation unit configured to create meta-information that is used in submitting the content to the overlay network; a transmission unit configured to transmit the meta-information created by the first creation unit to the center server; a first reception unit configured to receive the meta-information and an electronic signature verifying the meta-information, which is determined to be proper by the center server, from the center server, and a permission unit configured to permit the meta-information received by the first reception unit to be acquired on the overlay network.

9 Claims, 7 Drawing Sheets

(56) References Cited

U.S. PATENT DOCUMENTS

| | | |
|---|---|---|
| 2009/0083563 A1* | 3/2009 | Murase .................. 713/324 |
| 2009/0083809 A1* | 3/2009 | Hayashi et al. ............ 725/88 |
| 2009/0259847 A1* | 10/2009 | Li .......................... 713/168 |
| 2010/0146040 A1* | 6/2010 | Ramakrishnan et al. ..... 709/203 |
| 2010/0191825 A1 | 7/2010 | Yamagishi et al. |
| 2011/0016120 A1* | 1/2011 | Haughay et al. ............ 707/734 |
| 2011/0099226 A1 | 4/2011 | Liu et al. |
| 2011/0161668 A1* | 6/2011 | Sentinelli et al. ............ 713/168 |
| 2011/0276804 A1* | 11/2011 | Anzai et al. ................. 713/176 |
| 2012/0201418 A1* | 8/2012 | Bellwood et al. ............ 382/103 |

FOREIGN PATENT DOCUMENTS

| | | |
|---|---|---|
| JP | A-2006-190205 | 7/2006 |
| JP | A-2006-195744 | 7/2006 |
| JP | A-2006-197400 | 7/2006 |
| JP | A-2007-058597 | 3/2007 |
| JP | A-2008-129694 | 6/2008 |
| JP | A-2009-098818 | 5/2009 |
| JP | A-2009-259008 | 11/2009 |
| JP | A-2010-039722 | 2/2010 |
| JP | A-2010-250799 | 11/2010 |
| WO | WO 2007/141835 A1 | 12/2007 |

* cited by examiner

INFORMATION COMMUNICATION SYSTEM, INFORMATION COMMUNICATION METHOD, NODE APPARATUS AND RECORDING MEDIUM

CROSS-REFERENCE TO RELATED APPLICATION

This application is based upon and claims the benefit of priority of Japanese Patent Application No. 2011-039496 filed on Feb. 25, 2011, the contents of which are incorporated herein by reference in its entirety.

BACKGROUND

The present disclosure relates to a communication system using an overlay network having a plurality of node apparatuses capable of communicating with each other via a network. More particularly, the present disclosure relates to a content submission technology of a communication system using an overlay network.

In recent years, a communication system using an overlay network has been developed. Specifically, a peer-to-peer communication system has been developed. In such a communication system, content data is transmitted and received between terminal apparatuses, so that the communication system can operate as a peer-to-peer communication system.

SUMMARY

When content is delivered by the conventional peer-to-peer communication system, inappropriate content may be submitted to the communication system. In order to solve the problem, a management apparatus that manages the submission of the content to the peer-to-peer communication system may be provided. In this case, posting processing of the content to the Internet is collectively managed by the management apparatus. Thereby, it is possible to restrict the posting of content, which is inappropriate for Internet disclosure, by each terminal apparatus. However, according to this way, the posting processing of the content is concentrated in the management apparatus. In the meantime, it may be considered to enable each terminal apparatus of the peer-to-peer communication system to execute the posting processing, instead of the management apparatus. In this case, like the conventional peer-to-peer communication system, it is not possible to limit the posting of content, which is inappropriate for internet disclosure.

An aspect of the present disclosure has been made to solve the above problems. One of objects of the aspect of the present disclosure is to provide an information processing system, an information communication method, a node apparatus and a program capable of restricting the posting of content, which is inappropriate for internet disclosure, while preventing posting processing from being concentrated in a management apparatus.

The aspect of the present disclosure provides the following arrangements:

An information communication system in which a content is distributed and stored by an overlay network configured by a plurality of node apparatuses and which comprises a center server configured to manage the content to be submitted to the overlay network, the information communication system comprising:

the node apparatus comprising a first controller configured to control the node apparatus to:
create meta-information that is used in submitting the content to the overlay network;
transmit the created meta-information to the center server;
receive the meta-information and an electronic signature verifying the meta-file from the center server; and
permit the received meta-information to be acquired on the overlay network; and the center server comprising a second controller configured to control the center server to:
receive the meta-information from the node apparatus;
determine whether the received meta-information is proper meta-information; and
transmit the electronic signature to the node apparatus of a transmission source of the received meta-information in response determining that the received meta-information is proper meta-information.

An information communication method in an information communication system in which a content is distributed and stored by an overlay network configured by a plurality of node apparatuses and which comprises a center server that manages the content to be submitted to the overlay network, the information communication method comprising:
creating, by the node apparatus, meta-information that is used in submitting the content to the overlay network;
transmitting, by the node apparatus, the meta-information created by the first creation step to the center server;
receiving, by the center server, the meta-information transmitted from the node apparatus;
determining, by the center server, whether the meta-information received by the first reception step is proper meta-information;
transmitting, by the center server, an electronic signature to the node apparatus which is a transmission source of the received meta-information in response to the determination that the meta-information received by the first reception step is proper meta-information;
receiving, by the node apparatus, the meta-information and the electronic signature verifying the meta-information, which are transmitted from the center server; and
permitting, by the node apparatus, the received meta-information to be acquired on the overlay network.

A node apparatus of an information communication system in which a content is distributed and stored by an overlay network configured by a plurality of node apparatuses and which comprises a center server that manages the content to be submitted to the overlay network, the node apparatus comprising:
a first controller configured to control the node apparatus to;
create meta-information that is used in submitting the content to the overlay network;
transmit the created meta-information to the center server;
receive the meta-information and an electronic signature verifying the meta-information, which is determined to be proper by the center server, from the center server, and
permit the received meta-information to be acquired on the overlay network.

A non-transitory recording medium storing a program causing a computer of a node apparatus, which is provided in an information communication system in which a content is distributed and stored by an overlay network configured by a plurality of node apparatuses and which comprises a center server that manages the content to be submitted to the overlay network, to execute:

creating meta-information that is used in submitting the content into the overlay network;

transmitting the created meta-information to the center server;

receiving the meta-information and an electronic signature verifying the meta-information, which is determined to be proper by the center server, from the center server, and permitting the received meta-information to be acquired on the overlay network.

DESCRIPTION OF EXEMPLARY EMBODIMENTS

Hereinafter, exemplary embodiments will be described with reference to the drawings. The following exemplary embodiments show a peer-to-peer information communication system as an example of the aspect of the disclosure.

Outline Configuration of Information Communication System

Figure 1:
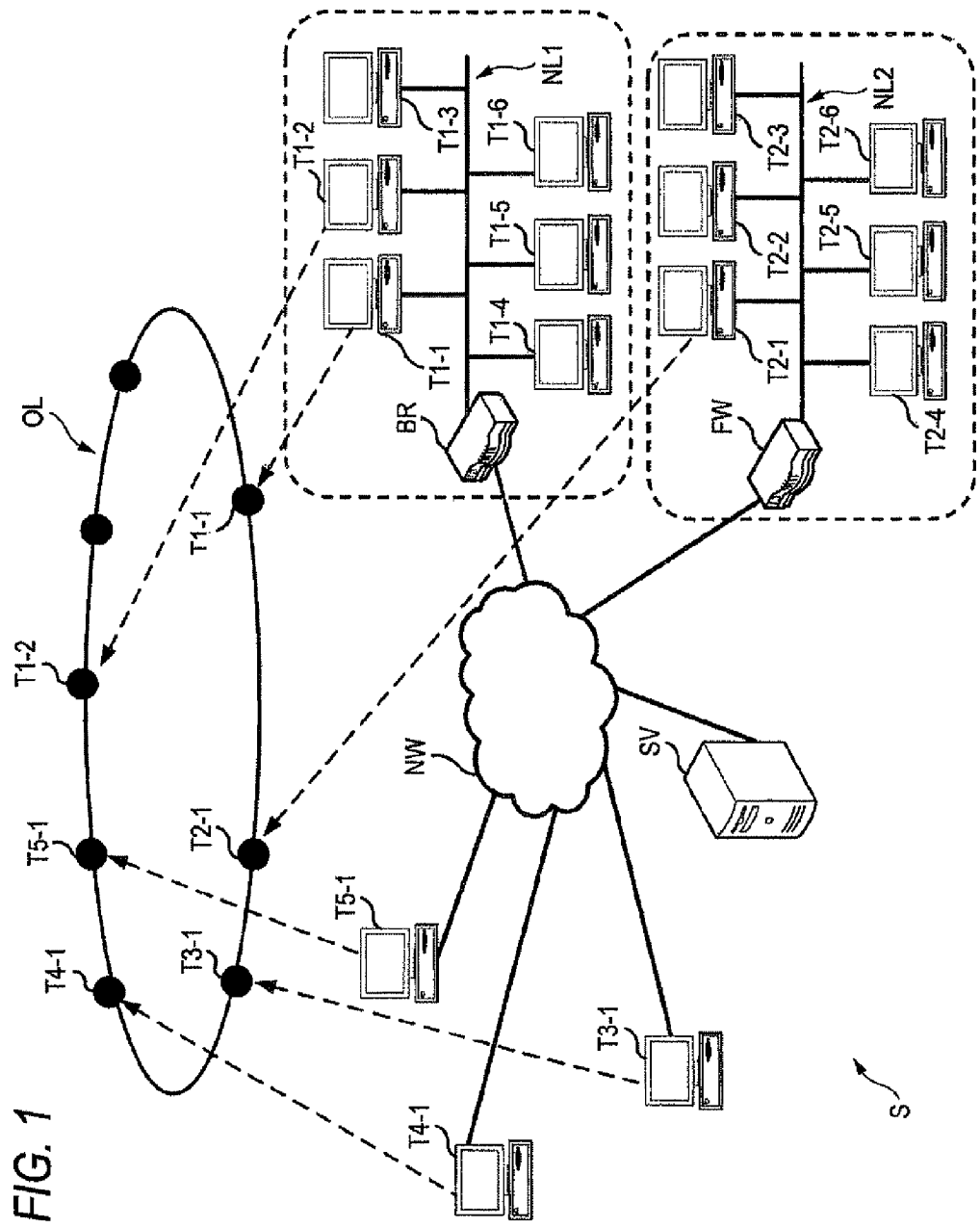
FIG. 1 shows an example of a connection aspect of respective node apparatuses Tm-n in an information communication system S according to an illustrative embodiment.

First, an outline configuration of an information communication system S according to an illustrative embodiment is described with reference to FIG. 1. As shown in FIG. 1, the information communication system S includes a plurality of node apparatuses Tm-n (m: one of 1, 2, 3 . . . , n: one of 1, 2, 3 . . . ). The node apparatuses Tm-n can communicate with each other via a network NW. The network NW is a communication network of a real world. For example, the network NW is the internet.

The network NW is a network for interconnecting respective base networks NLm. The network NW is the internet, the WAN (Wide Area Network) or the like, for example. The network NW is built by an IX (Internet eXchange), an ISP (Internet Service Provider), a DSL (Digital Subscriber Line) line company apparatus, an FTTH (Fiber To The Home) line company apparatus, a communication line and the like. On the other hand, the network NW may be a dedicated network of the information communication system S.

In this illustrative embodiment, one or more base networks NLm are formed in the network NW. Also, the node apparatuses Tm-n are connected to each base network NLm. Each base network NLm is a network that is established in a site of each base m. The base may be a company, a school, a hospital, an educational institute and the like. The base network NLm is established by a LAN and the like, for example. Alternatively, the base network NLm may be a network that is established by interconnecting a plurality of LANs. In this case, the LANs are connected through network devices such as routers.

As the network in which the LANs are interconnected, a CAN (Campus Area Network) may be exemplified. A firewall FW or broadband router BR is connected to each base network NLm. The firewall FW or broadband router BR is a communication device enabling the node apparatuses Tm-n connected to the base and a node apparatus Tm-n other than the node apparatuses Tm-n connected to the base to communicate with each other. Since the firewall FW or broadband router BR is well known, its detailed descriptions are omitted. It is arbitrarily determined whether to establish the firewall FW or broadband router BR in the base, for each base. In this illustrative embodiment, the base network NLm is a LAN (Local Area Network), for example.

Also, a center server SV is connected to the network NW. The center server SV stores therein original content data that is transmitted and received on an overlay network OL (which will be described later). In addition, the center server SV transmits content catalogue information to the node apparatus Tm-n. The content catalogue information will be specifically described later. The center server SV manages authentication information and contents IDs that are used in submitting the content data to the overlay network OL. Here, the submission of the content data means that the content data is left to be acquired from the node apparatus Tm-n. In the meantime, the content data is also referred to as 'content.' The center server SV will be specifically described later.

Each node apparatus Tm-n is allotted with an inherent serial number and an IP (Internet Protocol) address. Also, each node apparatus Tm-n connected to the information communication system S is allotted with a node ID that is inherent identification information consisting of predetermined digit numbers. In the information communication system S of this illustrative embodiment, the overlay network OL for content delivery is established. The overlay network OL is an overlay network that is established on the network NW. In other words, the overlay network OL is a logical network that is created on a physical network. Also, the overlay network OL is realized by a specific algorithm, for example an algorithm using a distributed hash table. The distributed hash table is referred to as 'DHT (Distributed Hash Table)'. In the meantime, a routing table using the DHT is known in US2007/283043(A1), for example.

In this illustrative embodiment, a port forwarding may be set in the broadband router BR or firewall FW so that the respective node apparatuses Tm-n can communicate with each other in a peer-to-peer way. For example, for the broadband router BR, it is preferable that the port forwarding is automatically set by using a UPnP (Universal Plug and Play) function and the like. In the below, the node apparatus Tm-n is simply referred to as a node apparatus.

Participation Method in Overlay Network OL

Each node apparatus keeps therein a routing table using the DHT. The routing table defines transmission destinations of various control messages on the information communication system S. The control message is a message that controls an operation of a peer-to-peer information communication system. In other words, the control message is a message that is used to retrieve or acquire the content in the peer-to-peer information communication system. Also, the control message is a message that is transmitted and received in accordance with the routing table of the DHT. Specifically, a plurality of node information, each of which includes a node ID of a node apparatus appropriately distant in an ID space, an IP address and a port number, is registered in the routing table. One node apparatus that is connected to the information communication system S stores minimum node information of the node apparatus as the routing table. As the control message is transmitted among the node apparatuses, node information about a node apparatus that does not store the above node information is acquired. Also, the control message is transmitted and received by each node apparatus, so that the information communication system S can operate as the peer-to-peer information communication system.

Also, a node apparatus that is not connected to the information communication system S transmits a participation message, which indicates a participation request in the information communication system S, to any connected node apparatus, so that the connection to the information communication system S is made. The participation in the information communication system S means that a node apparatus is connected to the information communication system S and can acquire content from the information communication system S. That is, the participation in the overlay network OL means that a node apparatus operates at a state in which it can transmit and receive a variety of messages to and from the other nodes through the overlay network OL, based on the routing table using the DHT. Any node apparatus is a contact node that is connected to the information communication system S all the time, for example. As a node apparatus participating in the information communication system S transmits the participation message to the contact node, the node apparatus can acquire the routing table of the DHT from the contact node.

Outline of Content Acquisition Operation

In the information communication system S, a variety of contents having different contents are distributed and stored in the plurality of node apparatuses. The contents are respectively assigned with a content name and a content ID that is inherent identification information for each content data by the center server SV. The attribute information of the respective contents such as content name and content ID is described in the content catalogue information. The content catalogue information is prepared by the center server SV and is delivered to all the node apparatuses. Also, the respective contents are divided into a plurality of data. The divided data is referred to as 'chunk.' In the below, content submission processing of this illustrative embodiment is specifically described with reference to FIGS. 2 and 3.

Figure 2:
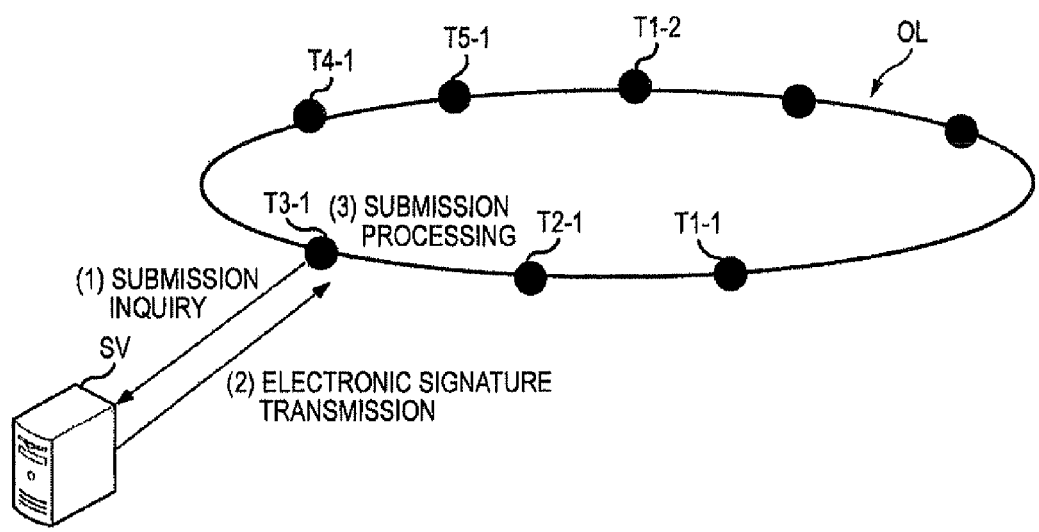
FIG. 2 is a conceptual view showing an example of authentication processing according to an illustrative embodiment.

In a system in which content is submitted to a network, when all users submit contents, inappropriate content may be submitted by a vicious user. In order to prevent this, when submitting content, a method of collectively managing contents to be disclosed in a server and the like is generally used. According to this method, when content is submitted to a network, the content is first submitted to a predetermined server. Then, when the content is submitted, the server assigns a content ID to the submitted content. Then, the server divides the submitted content into chunks. The server also assigns content IDs to the divided contents. Finally, the server provides information for checking whether the submitted content is altered and discloses the content in the network. This is an electronic signature, for example. However, according to this method, the load of the submission processing is concentrated in the specific server. In order to solve this problem, in this illustrative embodiment, as shown in FIG. 2, before content is submitted, the center server SV transmits an electronic signature to a node apparatus to which the content can be submitted. First, when the node apparatus T3-1 shown in FIG. 2 participates in the overlay network OL, it inquires of the center server SV whether content can be submitted (FIG. 2: (1)). When it is determined by the center server SV that the contents can be submitted, an electronic signature is transmitted from the center server SV to the node apparatus T3-1 of the inquiry source (FIG. 2: (2)). When the node apparatus T3-1 receives the electronic signature, it stores the received electronic signature in a storage unit of the node apparatus T3-1. When submitting the content, submission processing is executed in the node apparatus T3-1 (FIG. 2: (3)). In this illustrative embodiment, the submission processing of the node apparatus includes following processes.

1. Contents ID assignment processing
2. Chunk division processing
3. Chunk ID assignment processing
4. Chunk hash value creation processing
5. Meta-information file creation processing <Content ID Assignment Processing>

When content submission processing is executed by a node apparatus, the node apparatus first assigns a content ID to content to be submitted. The content ID that is assigned at this time may be randomly created by a node. Also, an assignment range of content IDs that can be assigned by the respective node apparatuses may be preset. For example, the assignment range is content IDs in which the predetermined number of bits matches from node ID upper bits assigned to the respective nodes. In this case, the content ID may be randomly determined within the assignment range.

<Chunk Division Processing>

In this illustrative embodiment, each chunk is created by dividing the content into a predetermined data size from the node apparatus, for example. In this illustrative embodiment, the minimum data size of the chunk is 2 MB (Mega Byte). Also, the maximum data size of the chunk is 128 MB. As a result of the chunk division, a part of the chunks may be smaller than 2 MB. Also, when a data size before the chunk division is originally smaller than 2 MB, a chunk having a data size smaller than 2 MB may be made. In this illustrative embodiment, although the content data is divided the plurality of the chunks, the content data may not be divided into a plurality of chunks, as described in this illustrative embodiment. The content data that has not been divided may be applied to this illustrative embodiment. The respective chunks are distributed and stored in the plurality of node apparatuses. Thereby, the original content is distributed and stored in the plurality of node apparatuses. The original data of the respective chunks is stored in the center server SV.

<Chunk ID Assignment Processing>

The node apparatus assigns a sequence number and a chunk ID to each chunk. The sequence number corresponds to an arrangement sequence that is made when the divided chunks are arranged to configure the original content, for example. The chunk ID is inherent identification information assigned to each chunk.

<Chunk Hash Value Creation Processing>

When the node apparatus assigns the chunk ID, it creates a hash value. The hash value is created by using a predetermined hash function. The hash value is used so as to check whether the chunk is altered, for example.

<Meta-Information File Creation Processing>

When the chunk ID and the hash value of the chunk are created, a meta-information file is created. The meta-information file is information for retrieving the content consisting of the divided chunks. The meta-information file includes the assigned chunk ID, the sequence number and the hash value of the chunk. Also, the meta-information file is assigned with the content ID of the content consisting of the divided chunks. When each node apparatus acquires the content ID of any content, it also acquires the meta-information file. Specifically, based on the content ID assigned to the meta-information file, the node apparatus acquires the meta-information file. When the node apparatus acquires the meta-information file, it also acquires the chunk ID included in the meta-information file. Based on the acquired chunk ID, the chunk of the content is acquired. Thereby, it is possible to acquire the chunk IDs of the respective chunks configuring the content, in correspondence to the sequence numbers of the chunks.

In the meantime, the node apparatus that stores the chunk of this illustrative embodiment is referred to as a 'content storage node.' Also, a location of the chunk is stored, as index information, in a node apparatus that manages or stores locations of chunks. In the below, the node apparatus that manages the location of the chunk is referred to as a 'root node.' The index information includes a set of node information of the node apparatus that stores the chunk and the chunk ID of the chunk. The root node is defined so that it becomes a node having a node ID closest to the chunk ID. The node ID closest to the chunk ID is a node ID in which upper digits of the ID match most those of the chunk ID.

Figure 3:
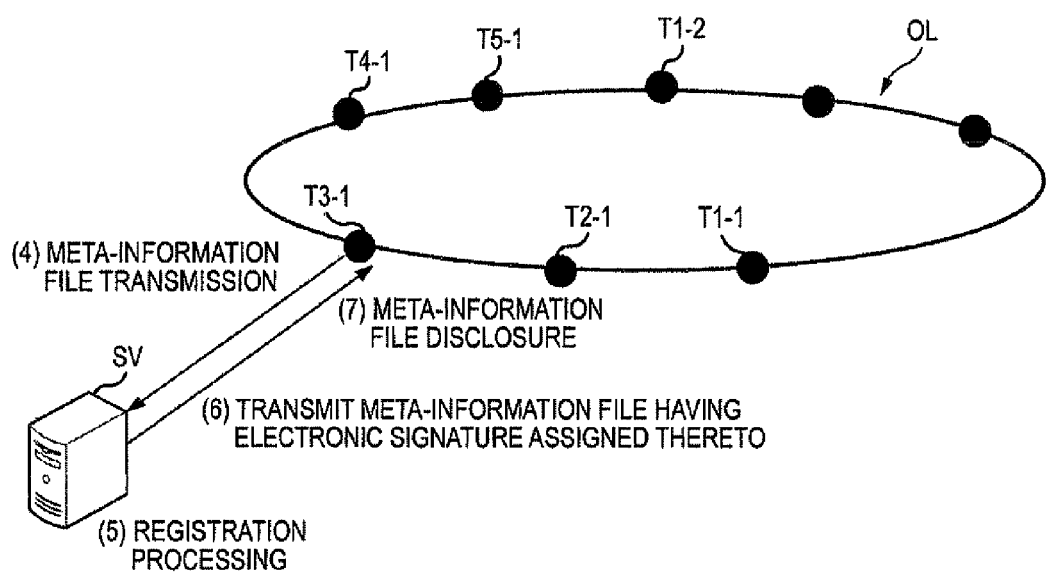
FIG. 3 is a conceptual view showing an example of authentication processing according to an illustrative embodiment.

When the meta-information file is created by the above processing, the node apparatus T3-1 shown in FIG. 3 transmits the created meta-information file to the center server SV (FIG. 3(4)). When the center server SV receives the meta-information file, it executes registration processing, based on the received meta-information file (FIG. 3(5)). First, the center server SV executes authentication processing by the electronic signature of the node apparatus having transmitted the meta-information file. The authentication processing is processing of determining whether the node apparatus of the transmission source of the meta-information file is a proper apparatus. When it is authenticated that the node apparatus is a proper apparatus, the center server SV stores the received meta-information file and the content ID assigned to the meta-information file in association with each other. Then, the center server SV transmits the meta-information file having the electronic signature attached thereto to the node apparatus T3-1 of the transmission source of the meta-information file (FIG. 3(6)). When the node apparatus T3-1 receives the meta-information file having the electronic signature attached thereto, it discloses the received meta-information file so that it can be transmitted and received on the overlay network OL (FIG. 3(7)). The disclosure of the meta-information file means that a user node notifies the root node that the user node as the content storage node has stored the meta-information file. In the meantime, the method of disclosing the meta-information file will be specifically described later.

Hereinafter, the content acquisition operation of this illustrative embodiment is specifically described. When a user of any node apparatus wants to acquire desired content, the anode apparatus retrieves the content storage nodes that store therein the respective chunks configuring the desired content. In the below, the node apparatus with which a user desires to acquire the chunk is referred to as a 'user node.' Specifically, the user node transmits a retrieval message. The retrieval message includes the content ID of the content that the user wants to acquire and the node information of the user node. The retrieval message is transmitted to the other node apparatus in accordance with the routing table of the DHT that the user node stores therein. That is, the user node transmits the retrieval message toward the root node. Thereby, the retrieval message finally reaches the root node by a DHT routing in which the content ID is used as a key. In the meantime, since the DHT routing is well known in US2007/283043(A1), for example, the detailed descriptions thereof are omitted.

The root node having received the retrieval message acquires one or more index information corresponding to the content ID included in the retrieval message from an index information cache. The acquired index information is replied to the user node, which is the transmission source of the retrieval message, based on the node information of the user node. The user node having acquired the index information acquires or downloads the meta-information file corresponding to the content ID, based on the index information. Specifically, the user node transmits a content request message to the content storage node, based on an IP address, a port number and the like of the content storage node included in the index information. The content request message contains therein the node information of the user node and the content ID of the desired content. When the content storage node receives the content request message, the content storage node transmits or uploads the meta-information file, which corresponds to the content ID contained in the content request message, to the user node. In the meantime, when there is no content storage node that stores the desired meta-information file, the user node cannot acquire the index information of the content storage node. In this case, the user node may acquire the meta-information file from the center server SV.

Alternatively, the root node transmits a content transmission request message to the content storage node that is indicated by the IP address and the like contained in the index information. The content transmission request message contains the node information of the transmission source of the content request message. The content storage node having received the content transmission request starts to transmit or upload the meta-information file to the user node that is indicated by the node information contained in the received message. Thereby, the user node can acquire the meta-information file from the content storage node.

Then, when the user node acquires and stores the meta-information file from the content storage node, it discloses the meta-information file. To disclose the meta-information file is to notify the root node that the user node as the storage node has stored the meta-information file. As the meta-information file is disclosed, the other node apparatuses can acquire the disclosed meta-information file from the disclosed content storage node. Specifically, the user node having stored the meta-information file transmits a publish message. The publish message includes the content ID of the meta-information file and the node information of the user node having stored the meta-information file. The publish message is transmitted toward the root node. Thereby, like the retrieval message, the publish message reaches the root node by the DHT routing in which the content ID is used as a key. The root node stores the index information, which includes the set of the node information and content ID contained in the received publish message, in the index information cache. By doing so, the user node newly becomes the content storage node that stores the meta-information file.

When the user node acquires the meta-information file, it transmits a chunk retrieval message, based on the chunk ID included in the acquired meta-information file. The chunk retrieval message includes the node information of a chunk ID user node. The chunk retrieval message is transmitted to the other node apparatus in accordance with the routing table of the DHT stored in the user node. That is, the user node transmits the chunk retrieval message toward the root node of the chunk. Thereby, the chunk retrieval message finally reaches the root node of the chunk by the DHT routing in which the chunk ID is used as a key. In the meantime, since the DHT routing is well known in US2007/283043(A1), for example, the detailed descriptions thereof are omitted.

The root node having received the chunk retrieval message acquires one or more index information, which corresponds to the chunk ID contained in the chunk retrieval message, from the index information cache. The acquired index information is replied to the user node that is the transmission node of the chunk retrieval message, based on the node information of the user node. The user node having acquired the index information acquires or downloads the chunk, based on the index information. Specifically, the user node transmits a chunk request message to the content storage node, based on an IP address, a port number and the like of the content storage node included in the index information. The chunk request message contains therein the node information of the user node and the chunk ID of the desired chunk. The content storage node having received the chunk request message transmits or uploads the chunk, which corresponds to the chunk ID contained in the chunk request message, to the user node. In the meantime, when there is no content storage node that stores the desired chunk, the user node cannot acquire the index information of the content storage node. In this case, the user node may acquire the chunk from the center server SV.

Alternatively, the root node transmits a chunk transmission request message to the content storage node that is indicated by the IP address and the like contained in the index information. The chunk transmission request message contains the node information of the transmission source of the chunk request message. The content storage node having received the chunk transmission request starts to transmit or upload the chunk to the user node that is indicated by the node information contained in the received message. Thereby, the user node can acquire the chunk from the content storage node.

Then, when the user node acquires and stores the chunk from the content storage node, it discloses the chunk. To disclose the chunk is to notify the root node that the user node as the content storage node has stored the chunk. As the chunk is disclosed, the other node apparatuses can acquire the disclosed chunk from the disclosed content storage node. Specifically, the user node having stored the chunk transmits a publish message. The publish message includes the chunk ID of the chunk and the node information of the user node having stored the chunk. The publish message is transmitted toward the root node of the chunk. Thereby, like the retrieval message, the publish message reaches the root node by the DHT routing in which the chunk ID is used as a key. The root node stores the index information, which includes the set of the node information and chunk ID contained in the received publish message, in the index information cache. By doing so, the user node newly becomes the content storage node that stores the chunk.

Like this, the node apparatus acquires the electronic signature from the center server SV, thereby executing the submission processing. Thereby, it is possible to prevent the load of the submission processing from being concentrated in the specific server and to limit the posting of the content that is inappropriate for the internet disclosure by the electronic signature. Also, since the processing necessary to submit the content is distributed in the respective node apparatuses, it is possible to avoid the concentration of the submission processing in the center server.

Electrical Configuration of Node Apparatus

Figure 4:
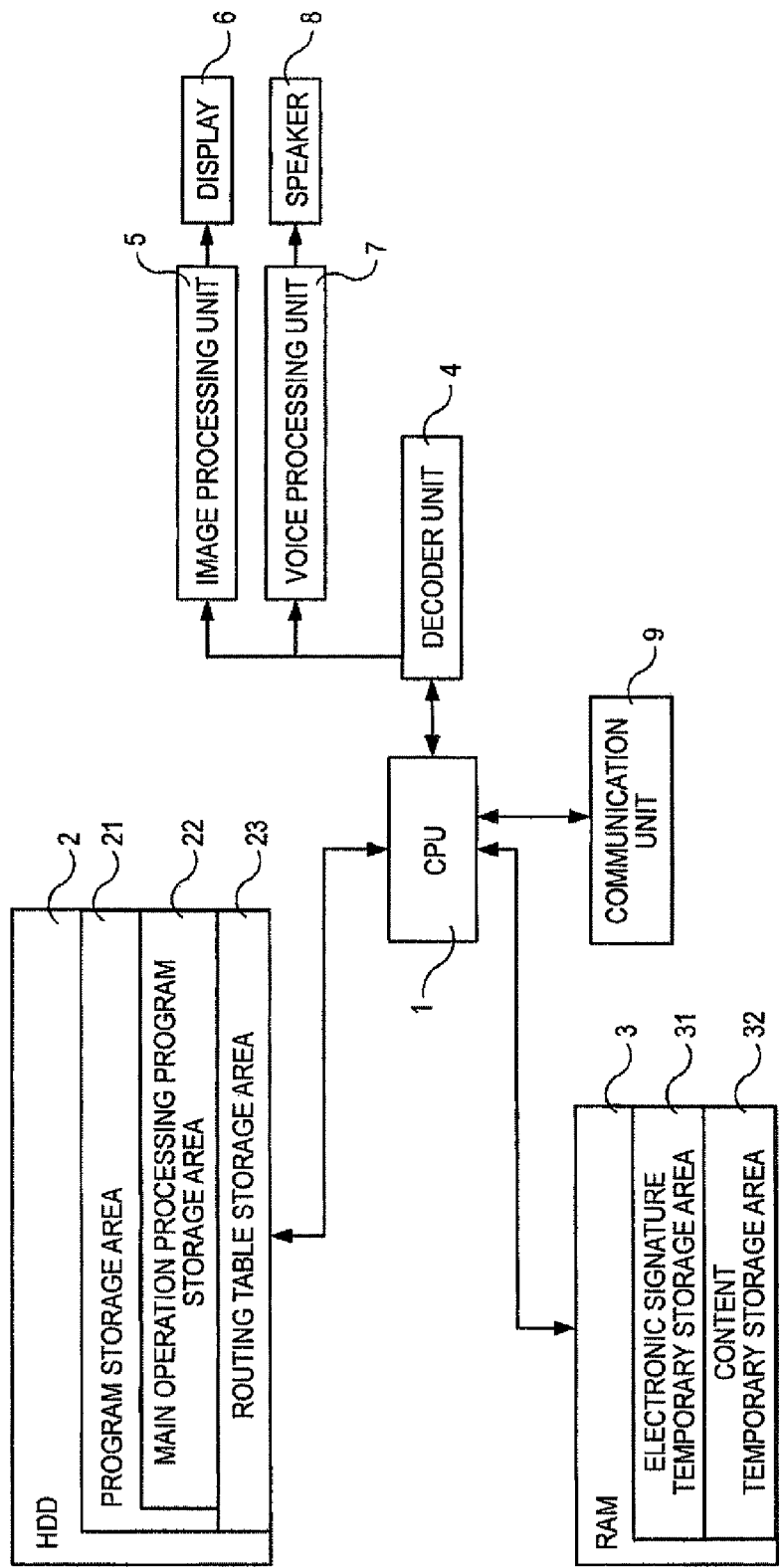
FIG. 4 is a conceptual view showing an electrical configuration of a node apparatus according to an illustrative embodiment.

In the below, an electrical configuration of the node apparatus is described with reference to FIG. 4. As shown in FIG. 4, the node apparatus of this illustrative embodiment has a CPU 1 that controls the node apparatus. The CPU 1 is electrically connected with a HDD 2, a RAM 3, a decoder unit 4 and a communication unit 9, respectively. The storage unit such as HDD 2 and RAM 3, and the CPU 1 configure a computer of the node apparatus. The CPU 1, the HDD 2, the RAM 3, the decoder unit 4 and the communication unit 9 are connected to each other through buses. In the meantime, as the node apparatus, a personal computer, a set top box (STB) and the like can be applied.

The HDD 2 includes a program storage area 21 and a routing table storage area 23. The program storage area 21 includes a main operation processing program storage area 22. The main operation processing program storage area 22 stores therein a main operation processing program. The main operation processing program is a program that enables the node apparatus to execute main operation processing. In the meantime, the main operation processing program of the node apparatus may be downloaded from a predetermined server on the network NW or may be recorded in a recording medium such as CD-ROM and then read out through a drive of the recording medium.

The routing table storage area 23 stores therein the routing table of the DHT of this illustrative embodiment.

The RAM 3 includes an electronic signature temporary storage area 31 and a content temporary storage area 32. The electronic signature temporary storage area 31 temporarily stores therein an electronic signature that is received from the center server SV. In this illustrative embodiment, the main operation processing program of the node apparatus is installed in the node apparatus and the electronic signature is acquired from the center server SV. At this time, the acquired electronic signature is temporarily stored in the electronic signature temporary storage area 31, The content temporary storage area 32 temporarily stores therein the content data that is transmitted and received on the overlay network OL.

The communication unit 9 performs communication control of information with the node apparatus or external apparatus through the network NW.

The node apparatus performs reception processing of receiving the content, chunk or meta-information file that is transmitted through the communication unit 9, as requested. In this illustrative embodiment, the content, chunk or meta-information file is packeted and transmitted. Each packet is received through the communication unit 9 and is temporarily stored in the content temporary storage area 32 of the RAM 3. The content that is temporarily stored is read out from the RAM 3 and is reproduced and output through the decoder unit 4, an image processing unit 5, a voice processing unit 7, a display unit 6 and a speaker 8. Alternatively, the content stored in the RAM 3 may be read out from the RAM 3 and then stored in the HDD 2. Alternatively, the content data may be directly stored in the HDD 2 without via the RAM 3. Then, the content is read out from the HDD 2 in accordance with an operation instruction that is input by a user. The read content is reproduced and output through the decoder unit 4, the image processing unit 5, the voice processing unit 7, the display unit 6 and the speaker 8. Thereby, the user can enjoy the content.

Electrical Configuration of Center Server SV

Figure 5:
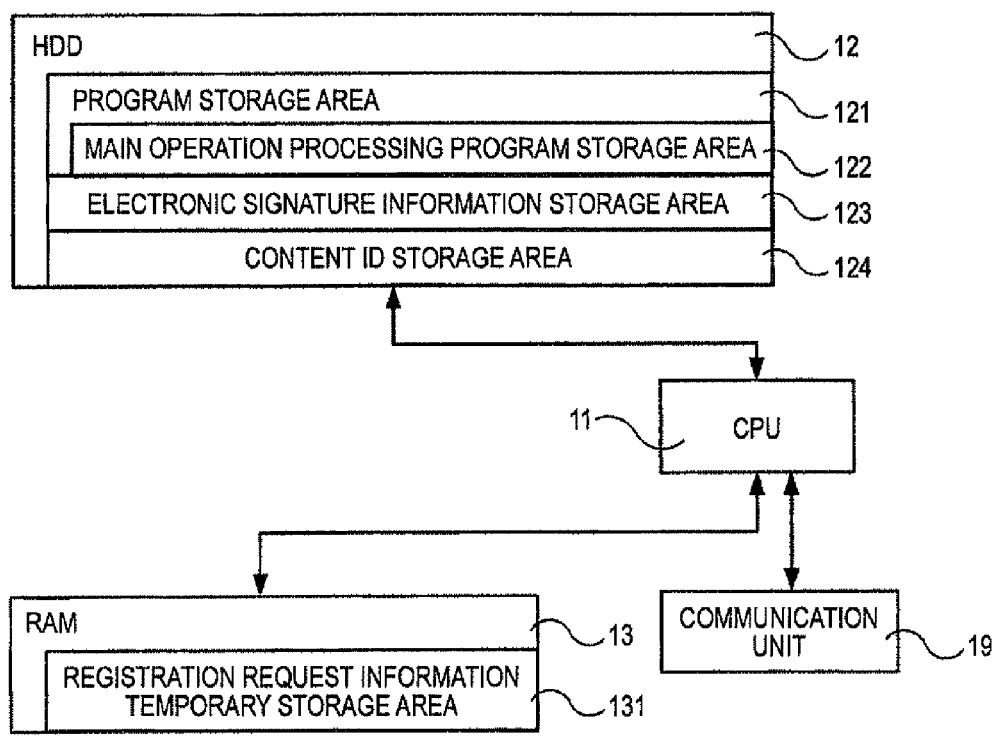
FIG. 5 is a conceptual view showing an electrical configuration of a center server SV according to an illustrative embodiment.

In the below, an electrical configuration of the center server SV is described with reference to FIG. 5. As shown in FIG. 5, the center server SV of this illustrative embodiment is provided with a CPU 11 that controls the center server SV. The CPU 11 is electrically connected with an HDD 12, a RAM 13 and a communication unit 19, respectively. The storage unit such as HDD 12 and RAM 13, and the CPU 11 configure a computer of the center server SV. The CPU 11, the HDD 12, the RAM 13 and the communication unit 19 are connected to each other through buses.

The HDD 12 includes a program storage area 121, an electronic signature storage area 123 and a content ID storage area 124. The program storage area 121 includes a main operation processing program storage area 122. The main operation processing program storage area 122 stores therein a main operation processing program of the center server SV.

The main operation processing program of the center server SV is a program that enables the center server SV to execute main operation processing.

The electronic signature storage area 123 stores therein an electronic signature. In this illustrative embodiment, the electronic signature is used. However, the invention is not limited thereto. For example, in addition to the electronic signature, information indicating that the node apparatus is an apparatus certified as proper may be used. Based on the electronic signature stored in the electronic signature storage area 123, the center server SV transmits the electronic signature to the node apparatus. The content ID storage area 124 stores therein a content ID. Specifically, assignment information and the content ID are stored in association with each other in the content ID storage area 124. The assignment information is information indicating whether the content ID associated with the assignment information has been already allotted to the content. Based on the assignment information, the center server SV determines whether or not to assign the content ID.

In the meantime, the main operation processing program of the center server SV may be downloaded from a predetermined server on the network NW or may be recorded in a recording medium such as CD-ROM and then read out through a drive of the recording medium.

The RAM 13 includes a registration request information temporary storage area 131. The registration request information temporary storage area 131 temporarily stores therein registration request information that is received from the node apparatus. In the meantime, the registration request information includes the meta-information file, the content ID and the electronic signature. Based on the content ID stored in the registration request information temporary storage area 131 and the assignment information stored in the content ID storage area 124, it is determined whether the content ID stored in the registration request information temporary storage area 131 can be assigned or not. The registration request information will be specifically described later.

The communication unit 19 performs communication control of information with the node apparatus or external apparatus through the network NW.

Main Operation of Node Apparatus

Figure 6:
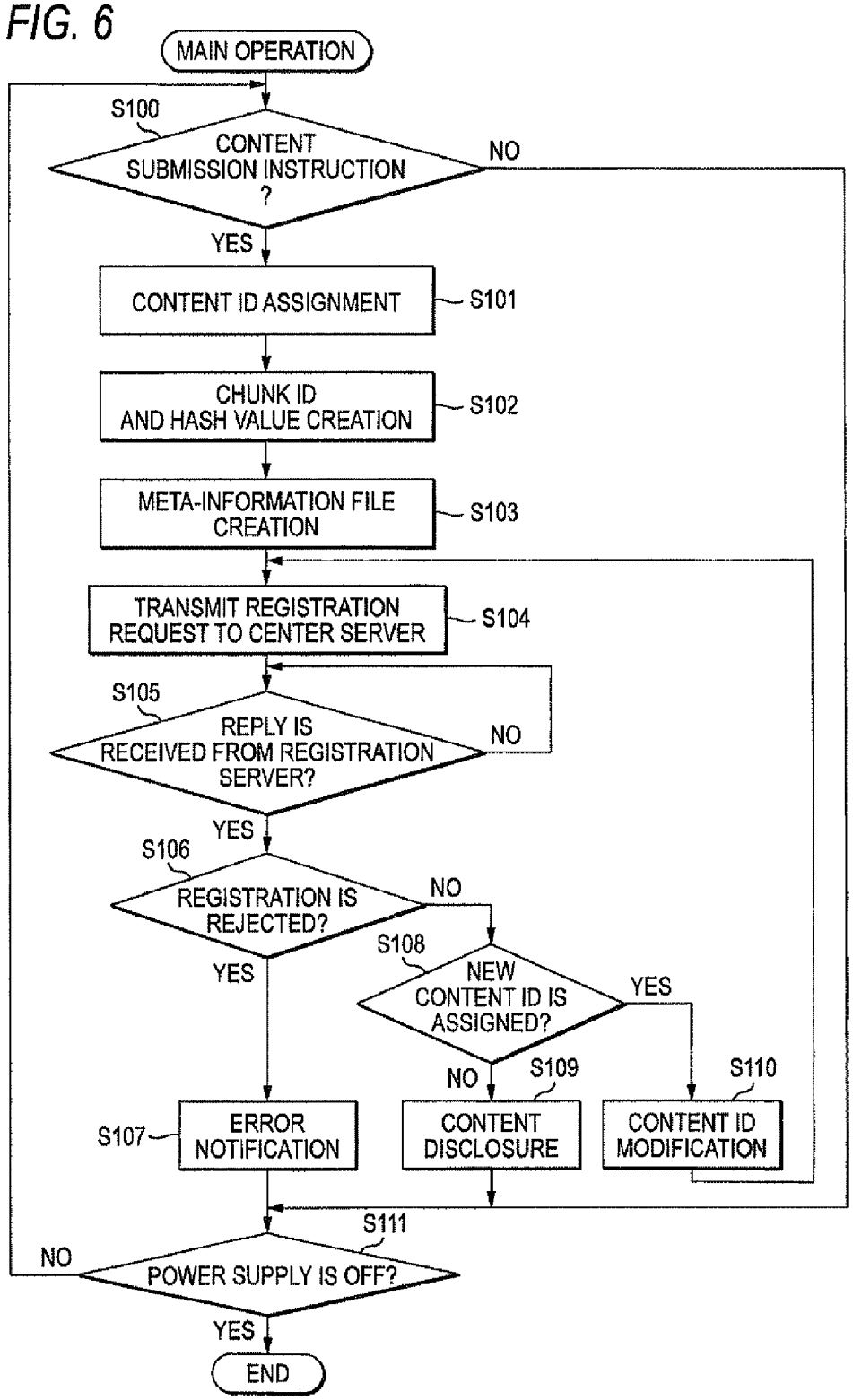
FIG. 6 is a flowchart showing main operation processing of a node apparatus according to an illustrative embodiment.

The operations of the node apparatus of this illustrative embodiment that has been described in the above are described with reference to the drawings. First, the operations of the node apparatus are described with reference to FIG. 6. The main operation of the node apparatus is executed as the node apparatus is connected to an external power supply such as commercial power supply through a power supply or outlet. Following processing is executed by the CPU 1.

In a step S100, it is determined whether there is a content submission instruction. The content submission instruction is input by an input unit (not shown) of the node apparatus, for example. When it is determined that there is a content submission instruction (S100: YES), a step S101 is executed. When it is not determined that there is a content submission instruction (S100: NO), a step S111 is executed.

In the step S101, the content submitted in the step S100 is assigned with a content ID. Also, in the step S101, the content ID assigned to the content is also assigned to the meta-information file of the submitted content.

In a step S102, a hash value is created. In the step S102, the content for which the submission instruction has been issued is first divided into chunks. Then, has values of the divided chunks are created.

In a step S103, a meta-information file is created. In the step S103, chunk IDs are first assigned to the chunks created in the step S102. Then, a meta-information file including the assigned chunk IDs, the hash values of the chunks and the sequence numbers is created. The created meta-information file is assigned with the content ID assigned in the step S101.

In a step S104, a registration request is transmitted to the center server SV. In the step S104, the meta-information file created in the step S103, the assigned content ID and the electronic signature are transmitted to the center server SV, as the registration request information.

In a step S105, it is determined whether a reply is received from the center server SV. In the step S105, it is determined whether a reply transmitted by the center server SV is received or not. When it is determined that a reply is received (S105: YES), a step S106 is executed. In the step S105, when it is not determined that a reply is received (S105: NO), the step S105 is repeatedly executed. In the meantime, the reply received in the step S105 is temporarily stored in a predetermined storage area of the RAM 3.

In a step S106, it is determined whether the reply received in the step S105 is a response indicating that the registration of the meta-information file has been rejected. When it is determined that the reply is a response indicating that the registration of the meta-information file has been rejected (S106: YES), a step S107 is executed. When it is not determined that the reply is a response indicating that the registration of the meta-information file has been rejected (S106: NO), a step S108 is executed.

In the step S107, an error is notified. Specifically, an error indicating that the content submission has failed is notified.

In the step S108, it is determined whether the reply received in the step S105 is a response indicating that the content ID has been newly assigned to the meta-information file. In this case, the response received in the step S105 includes the content ID that has been newly assigned by the center server SV. When the reply received in the step S105 is a response indicating that the content ID has been newly assigned to the meta-information file, the content ID newly assigned is received from the center server SV in the step S105 and then temporarily stored in the RAM 3. When it is determined that the reply is a response indicating that the content ID has been newly assigned to the meta-information file (S108: YES), a step S110 is executed. When it is not determined that the reply is a response indicating that the content ID has been newly assigned to the meta-information file (S108: NO), a step S109 is executed.

In the step S109, the content for which the submission instruction has been issued in the step S100 is disclosed. Specifically, a publish message of the content for which the submission instruction has been issued in the step S100 is transmitted, so that the content for which the submission instruction has been issued can be acquired on the overlay network OL.

In the step S110, the content ID temporarily stored in the step S105 is assigned to the content for which the submission instruction has been issued in the step S100. Then, the registration request is again transmitted to the center server SV in the step S104.

In the step S111, it is determined whether the power supply is off. When it is determined that the power supply is off, the main operation of the node apparatus is ended. When it is not determined that the power supply is off, the step S100 is executed.

Main Operation of Center Server SV

Figure 7:
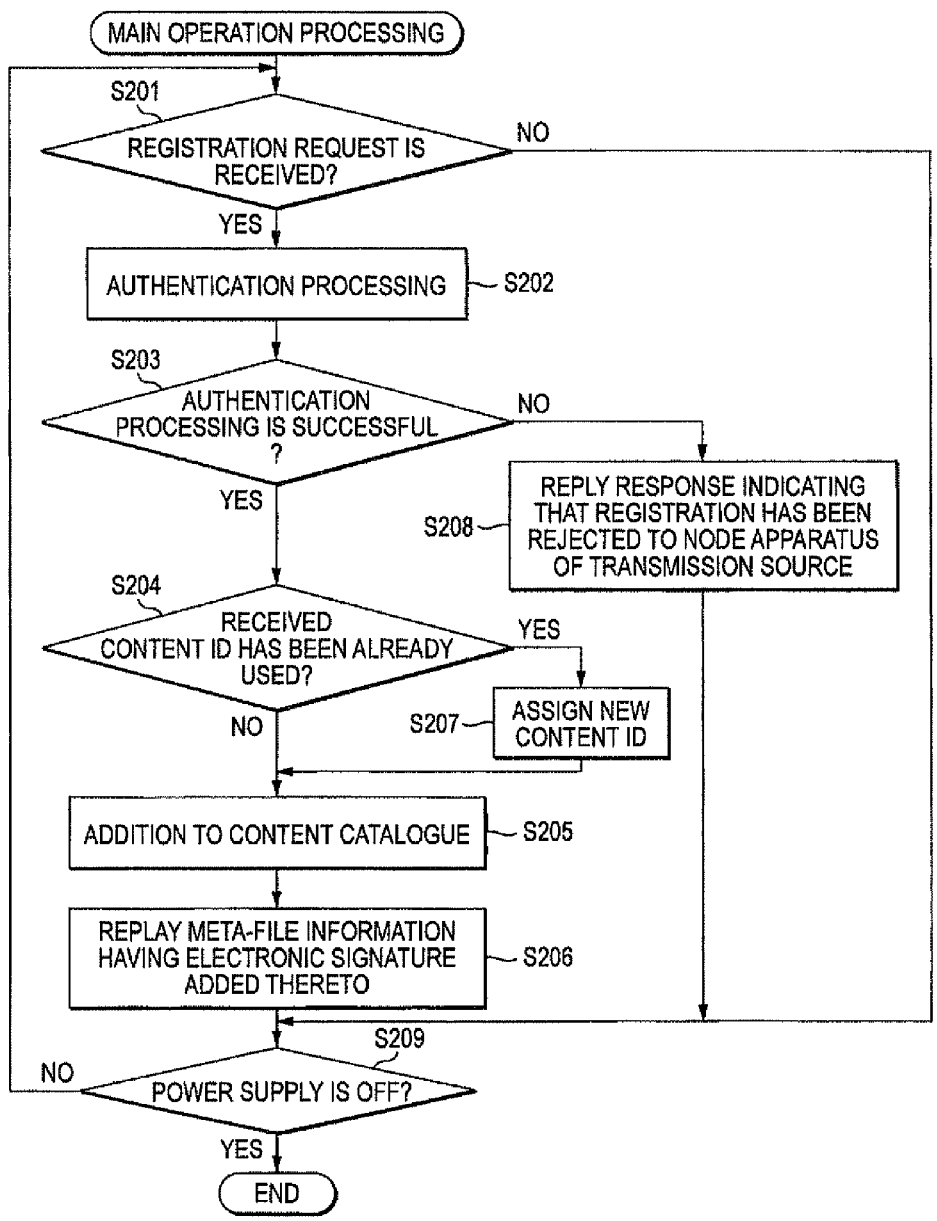
FIG. 7 is a flowchart showing main operation processing of a center server SV according to an illustrative embodiment.

In the below, the operations of the center server SV of this illustrative embodiment are described with reference to FIG. 7. The main operation of the center server SV is executed as the node apparatus is connected to an external power supply such as commercial power supply through a power supply or outlet. Following process is executed by the CPU 11.

In a step S201, it is determined whether the registration request information is received from the node apparatus. The registration request information that is received in the step S201 is the registration request information that has been transmitted from the node apparatus in the step S104. When it is determined in the step S201 that the registration request information is received (S201: YES), a step S202 is executed. When it is not determined in the step S201 that the registration request information is received (S201: NO), a step S209 is executed.

In a step S202, authentication processing is executed. Specifically, based on the electronic signature included in the registration request received in the step S201, the authentication processing is executed. In the step S202, it is determined whether the electronic signature received in the step S201 is a proper electronic signature.

In a step S203, it is determined whether a result of the authentication processing in the step S202 is successful. Specifically, when it is determined in the step S202 that the electronic signature received in the step S201 is a proper electronic signature, it is determined that the authentication processing is successful. When it is determined that the authentication processing is successful (S203: YES), a step S204 is executed. When it is not determined that the authentication processing is successful (S203: NO), a step S208 is executed.

In a step S204, based on the assignment information stored in the content ID storage area 124, it is determined whether the content ID, which is contained in the registration request information received in the step S201, has been already allotted. Specifically, the assignment information corresponding to the content ID stored in the registration request information temporary storage area 131 is determined from the assignment information stored in the content ID storage area 124. Then, it is determined whether the determined assignment information indicates that the content ID has been already allotted. When the assignment information corresponding to the content ID contained in the registration request information received in the step S201 indicates that the content ID has been already allotted, it is determined that the content ID has been already used. When it is determined that the content ID has been already used (S204: YES), a step S207 is executed. When it is not determined that the content ID has been already used (S204: NO), a step S205 is executed.

In the step S205, the content ID received in the step S201 or the content ID newly assigned in the step S207 is added to the content catalogue information. Then, the content catalogue information having the content ID added thereto is transmitted to the node apparatus that participates in the overlay network OL.

In a step S206, the electronic signature is assigned to the meta-information file received in the step S201. Then, the meta-information file having the electronic signature assigned thereto is transmitted to the node apparatus of the transmission source of the registration request information received in the step S201.

In the step S207, a content ID different from the content ID received in the step S201 is assigned. Specifically, a new content ID, which does not indicate that the assignment information stored in the content ID storage area 124 has been already allotted to the content, is determined. From the determined content ID, a content ID that will be newly assigned is determined. In the meantime, the new content ID may be randomly determined by the center server SV.

In the step S208, a response indicating that the registration has been rejected is transmitted to the node apparatus of the transmission source of the registration request.

In the step S209, it is determined whether the power supply is off. When it is determined that the power supply is off (S209: YES), the main operation of the center server SV is ended. When it is not determined that the power supply is off (S209: NO), the step S201 is executed.

In this illustrative embodiment, as shown in the step S109, the content for which the submission instruction has been issued in the step S100 is disclosed. Then, the publish message of the content for which the submission instruction has been issued in the step S100 is transmitted, so that the content for which the submission instruction has been issued can be acquired on the overlay network OL. As a modified embodiment of this illustrative embodiment, the publish message may not be transmitted in the step S109 and the acquisition may be permitted from another node apparatus through the network.

In this illustrative embodiment, the peer-to-peer communication system using the routing table of the DHT is applied to the overlay network OL. However, the invention is not limited thereto. That is, the invention can be applied to another peer-to-peer communication system or a system using the overlay network. For example, the invention may be applied to a communication system or peer-to-peer communication system in which a routing table other than the DHT is used. The peer-to-peer communication system in which the DHT is not used may include a hybrid-type peer-to-peer communication system. The invention may be applied to a hybrid-type peer-to-peer communication system or pure-type peer-to-peer communication system. Also, the invention may be applied to an information communication system in which the overlay network is not used. For instance, the invention may be applied to a system in which the content is distributed and stored in a plurality of server apparatuses.

What is claimed is:

1. An information communication system in which a content is distributed and stored by an overlay network configured by a plurality of node apparatuses including a first node apparatus and which comprises a center server configured to manage the content to be submitted to the overlay network, the information communication system comprising:
    the first node apparatus comprising a first controller configured to control the first node apparatus to:
        assign content identification information, which identifies the content on the overlay network, to the content;
        divide the content into a plurality of chunks;
        assign chunk identification information and sequence number to each of the plurality of chunks;
        create hash value related to the plurality of chunks:
        create meta-information including the chunk identification information, the sequence number and the hash value, the meta-information being assigned the content identification information and being to be used in searching the content to the overlay network;
        transmit the created meta-information to the center server;
        receive the meta-information and an electronic signature verifying the meta-file from the center server; and
        permit the received meta-information to be acquired on the overlay network; and
    the center server comprising a second controller configured to control the center server to:
        receive the meta-information from the first node apparatus;

determine whether the received meta-information is proper meta-information; and transmit the electronic signature to the first node apparatus of a transmission source of the received meta-information in response determining that the received meta-information is proper meta-information.

2. The information communication system according to claim 1, wherein the first controller controls the first node apparatus to:
create chunk information checking whether the content to be submitted to the overlay network is altered; and
create the meta-information that also includes the created chunk information.

3. The information communication system according to claim 1, wherein
the first node apparatus includes a first storage unit configured to store authentication information indicating that the submission of the content to the overlay network is permitted, and
the first controller controls the first node apparatus to transmit the created meta-information and the authentication information stored in the first storage unit to the center server, and
the second controller controls the center server to:
receive the meta-information and the authentication information transmitted by the first node apparatus; and
determine whether the received meta-information is proper meta-information, based on the received meta-information and the received authentication information.

4. The information communication system according to claim 1, wherein the center server includes:
a second storage unit configured to store the authentication information received by the second reception unit and the identification information included in the meta-information in association with each other; and
the second controller controls to center server to:
determine whether the received identification information is identification information being used in the overlay network, based on the identification information stored in the second storage unit, and
create identification information different from the determined identification information in response to determining that the received identification information is identification information being used in the overlay network.

5. The information communication system according to claim 1, wherein the center server includes:
a second storage unit configured to store the authentication information received by the second reception unit and the identification information included in the meta-information in association with each other; and
the second controller controls to:
determine whether the received identification information is identification information being used in the overlay network, based on the identification information stored in the second storage unit; and
transmit, to the first node apparatus, an instruction to create identification information different from the determined identification information in response to determining that the received identification information is identification information being used in the overlay network.

6. The information communication system according to claim 1, wherein the plurality of node apparatus includes a second node apparatus comprising a third controller to control the second node apparatus to:
acquire the meta-information based on the content identification information,
acquire the chunk identification information included in the meta-information, and
acquire the chunks of the content based on the acquired chunk identification information so that the chunk identification information of the chunks configuring the content is acquired in correspondence to the sequence numbers of the chunks.

7. An information communication method in an information communication system in which a content is distributed and stored by an overlay network configured by a plurality of node apparatuses including a first node apparatus and which comprises a center server that manages the content to be submitted to the overlay network, the information communication method comprising:
assigning, by the first node apparatus, content identification information, which identifies the content on the overlay network, to the content;
dividing, by the first node apparatus the content into a plurality of chunks;
assigning, by the first node apparatus, chunk identification information and sequence number to each of the plurality of chunks;
creating, by the first node apparatus, hash value related to the plurality of chunks;
creating, by the first node apparatus, meta-information including the chunk identification information, the sequence number and the hash value, the meta-information being assigned the content identification information and being to be used in searching the content to the overlay network;
transmitting, by the first node apparatus, the meta-information created by the first creation step to the center server;
receiving, by the center server, the meta-information transmitted from the first node apparatus;
determining, by the center server, whether the meta-information received by the first reception step is proper meta-information;
transmitting, by the center server, an electronic signature to the first node apparatus which is a transmission source of the received meta-information in response to the determination that the meta-information received by the first reception step is proper meta-information;
receiving, by the first node apparatus, the meta-information and the electronic signature verifying the meta-information, which are transmitted from the center server; and
permitting, by the first node apparatus, the received meta-information to be acquired on the overlay network.

8. A node apparatus of an information communication system in which a content is distributed and stored by an overlay network configured by a plurality of node apparatuses including a first node apparatus and which comprises a center server that manages the content to be submitted to the overlay network, the first node apparatus comprising:
a first controller configured to control the first node apparatus to:
assign content identification information, which identifies the content on the overlay network, to the content;
divide the content into a plurality of chunks;
assign chunk identification information and sequence number to each of the plurality of chunks;
create hash value related to the plurality of chunks;
create meta-information including the chunk identification information, the sequence number and the hash value, the meta-information being assigned the content identification information and being to be used in searching the content to the overlay network;

transmit the created meta-information to the center server;

receive the meta-information and an electronic signature verifying the meta-information, which is determined to be proper by the center server, from the center server; and permit the received meta-information to be acquired on the overlay network.

9. A non-transitory recording medium storing a program causing a computer of a node apparatus, which is provided in an information communication system in which a content is distributed and stored by an overlay network configured by a plurality of node apparatuses including a first node apparatus and which comprises a center server that manages the content to be submitted to the overlay network, to execute:

assigning, by the first node apparatus, content identification information;

which identifies the content on the overlay network, to the content;

dividing, by the first node apparatus, the content into a plurality of chunks;

assigning, by the first node apparatus, chunk identification information and sequence number to each of the plurality of chunks;

creating, by the first node apparatus, hash value related to the plurality of chunks;

creating, by the first node apparatus, meta-information including the chunk identification information, the sequence number and the hash value, the meta-information being assigned the content identification information and being to be used in searching the content into the overlay network;

transmitting, by the first node apparatus, the created meta-information to the center server;

receiving, by the first node apparatus, the meta-information and an electronic signature verifying the meta-information, which is determined to be proper by the center server, from the center server; and permitting, by the first node apparatus, the received meta-information to be acquired on the overlay network.

* * * * *